Jan. 2, 1962   R. T. DARBY ET AL   3,015,226
CYCLING LEACHING AND EXTRACTION APPARATUS
Filed Nov. 23, 1959   2 Sheets-Sheet 2

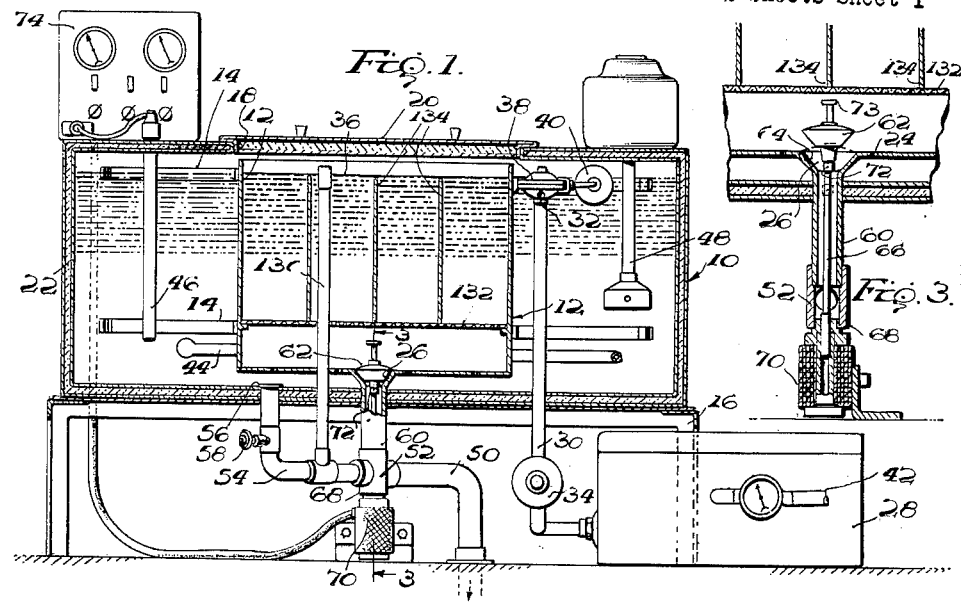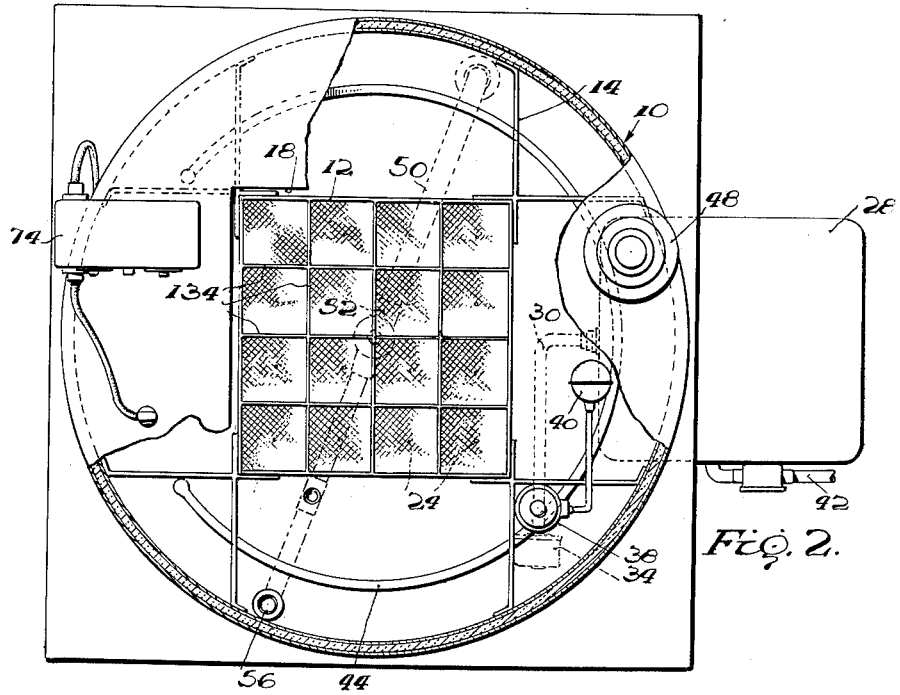

INVENTORS
Richard T. Darby.
Aaron David Boskin
Howard C. Lilly.
BY W. J. Eccleston
ATTORNEY

United States Patent Office 3,015,226
Patented Jan. 2, 1962

3,015,226
CYCLING LEACHING AND EXTRACTION APPARATUS
Richard T. Darby, Prospect St., Sherborn, Mass.; Aaron David Baskin, 3 Lynn St., Natick, Mass.; and Howard C. Lilly, Main St., Sherborn, Mass.
Filed Nov. 23, 1959, Ser. No. 854,987
12 Claims. (Cl. 68—181)
(Granted under Title 35, U.S. Code (1952), sec. 266)

The invention described herein, if patented, may be manufactured and used by or for the Government for governmental purposes, without the payment to use of any royalty thereon.

The present invention relates to leaching apparatus and more particularly to a leaching apparatus which periodically changes the leaching solution at intervals, the duration of which may be varied by the operator.

One test for determining the suitability of new compounds such as fungicides, water-repellents, fire retardants, dyes, etc., for the treatment of fabrics, paper, rope, or the like, is the resistance of these compounds to extraction from the fabrics or other materials which have been treated with these compounds. This may be determined by leaching the treated fabric or other treated material. The known leaching apparatus commonly subjects the fabric or other material under treatment to a continuous flow of water or other extractant solution such as a mixture of water and a suitable solvent. The apparatus of the present invention differs from the known leaching apparatus because it includes improved means for soaking the material under test in a suitable leaching solution and for periodically changing the solution so as not only to freshen the solution but also to subject the material under test to a flow of the solution therethrough both during draining and replenishment of the solution.

Accordingly, an object of the invention is to provide a new and improved leaching apparatus for soaking a material under test in water or other extractant and for periodically changing the water or other extractant in which the material under test is being soaked to freshen the same.

Another object of the invention is to provide a new and improved leaching apparatus as set forth in the foregoing object in which the duration of the periodic intervals at which the extractant is changed may be varied at will.

A further object of the invention is to provide a new and improved leaching apparatus including mechanism to control the temperature of the leaching solution.

A still further object of the invention is to provide a new and improved leaching apparatus in which water or other extractant is fed to a treating chamber in relatively small jet-like streams from the lower portion of the chamber and is gravitationally drained through the bottom of the chamber at a relatively slow rate so that a gentle and uniform flow is achieved through the material being tested during a change in extractant.

A more specific object of the invention is to provide a new and improved leaching apparatus having leaching and fluid supply chambers nested in spaced relation in which the leaching chamber is fed from the supply chamber through relatively small openings in the lower wall portion of the leaching chamber at pressures generated by the hydrostatic head in the supply chamber so that fluid is admitted to the leaching chamber in a plurality of low-pressure jet-like streams.

Another object of the invention is to provide a new and improved leaching apparatus as defined in the preceding object which is drained gravitationally through an opening the bottom of the leaching chamber which opening is small relative to the size of the chamber so that the flow of extractant from this chamber is relatively gentle.

A more general object of the invention is to provide a new and improved leaching apparatus which is relatively compact, simple, inexpensive and sturdy in construction, easy to operate, and readily adjustable to vary the operation thereof.

These and other objects, advantages, and capabilities of the invention will become apparent from the following description wherein reference is had to the accompanying drawings in which:

FIG. 1 is a more or less diagrammatic view of the leaching apparatus of the present invention partly in side elevation and partly in section with portions of the outer wall of the housing removed to show the internal construction of the device;

FIG. 2 is a top plan view of the improved leaching apparatus of the present invention with portions of the top wall removed;

FIG. 3 is a fragmentary vertical sectional view on the line 3—3 of FIG. 1;

Figure 4:
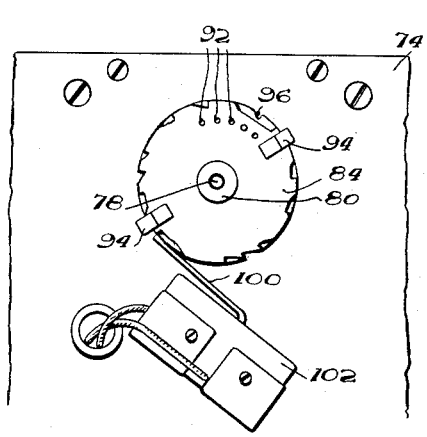
FIG. 4 is a front elevational view of a timing mechanism forming part of the apparatus of the present invention.

Referring particularly to FIGS. 1 and 2, the improved leaching apparatus of the present invention comprises an outer cylindrical tank or vessel 10 and an inner rectangular tank or vessel 12 disposed in nested relation with respect to the outer tank with its side and bottom walls spaced from the corresponding walls of the outer tank, the inner tank being rigidly fixed at this position by suitable brackets 14 extending between the inner and outer tanks adjacent the top and bottom of the inner tank. This assembly is supported on a suitable stand 16 at an elevated position. The inner and outer tanks preferably are made from stainless sheet steel, and the outer tank has an aperture 18 in the top wall thereof conforming generally to the peripheral contour of the sides of the inner tank through which access may be had to the inner tank. This opening is closed by a removable cover 20. Preferably, the outer tank and cover have inner and outer walls spaced from each other as seen in FIG. 1, the space between the walls being packed with a suitable thermal insulating material 22 such as Fiberglas, so that the fluid contained in this tank may be readily maintained at a uniform temperature when cover 20 is closed. Direct communication is established between the inner and outer tanks 12 and 10, respectively, through a plurality of uniformly spaced relatively small apertures or perforations 24 in the bottom wall of the inner tank 12, and this wall also has a centrally located aperture 26 of much larger size in cross section than the aggregate cross-section area of the perforations 24. In one embodiment of the invention, the outer tank was 42 inches in diameter and 19 inches high and the inner tank 24 inches square and 11 inches high. In this embodiment of the invention, the bottom wall of the inner tank 12 had sixteen 3/16-inch perforations formed therein and the effective size of the outlet aperture 26 was 1½-inches in diameter. The number and size of the perforations may, of course, be varied in accordance with variations in the size of the apparatus and the type of material under test.

A leaching or extractant solution which may be plain water or a solution of water and a suitable solvent is admitted to the outer tank 10 from a preheating tank or chamber 28 through a pipe or conduit 30 having an outlet 32 which discharges fluid into the outer tank 10 adjacent the top of the same. Any suitable conventional electrically operated pump, diagrammatically shown at 34 in FIG. 1, may be used to feed the liquid extractant solution from the preheating tank 28 to the outer tank 10 through the pipe or conduit 30.

Discharge from the outlet 32 is controlled by a suitable valve 38 operated by a float 40 in the outer tank 10 which closes the valve 38 when the level of the liquid in tank 10 approaches the top edge of the inner tank, the level to which the liquid normally rises in the outer tank 10 before the float valve 38 closes being indicated at 36 in FIG. 1. Operation of the pump 34 may be controlled so as to shut down the same when the float valve 38 closes by any suitable conventional control mechanism (not shown) such as a switch responsive to an increase in the pressure in the inlet conduit 30 upon closure of the float valve 38, or a switch operated by movement of the float 40 sufficient to close the valve 38.

The preheater 28, which may be located beneath the outer tank 10 as shown in FIG. 1, includes a conventional heating mechanism (not shown) such as an electrically operated immersion heater, energization of which may be controlled by a bimetallic thermostatic element (not shown) in the preheater. The extractant liquid is fed to preheater 28 through an inlet conduit 42 from any suitable source, and the preheater may be provided with suitable conventional level and temperature indicators (not shown).

By virtue of the construction above described, liquid extractant at a predetermined temperature is automatically delivered to the outer tank 10 whenever the level of the liquid therein drops far enough to cause the float 40 to open the float valve 38. The liquid contained in the outer tank 10 may be maintained at the predetermined temperature at which it is delivered thereto or further raised in temperature by a conventional electrically operable immersion heater 44 in the outer tank, operation of which is controlled by a suitable conventional thermostatic element 46 extending into the liquid in the outer tank. A conventional electrically operated liquid in the outer tank to insure uniformity thereof throughout the tank 10. Since the perforations 24 in the bottom wall of the inner tank 12 establish direction and continuous communication between the inner and outer tanks, the level of liquid in these two tanks will tend to equalize should the level in one drop below that in the other for any reason.

The two tanks 10 and 12 may be drained gravitationally through a common drain 50, one end of which is connected to a three-way fitting 52 and the other end of which is connected to a suitable drain pipe or the like. The outer tank 10 is connected to the common drain 50 through an elbow connection 54 having an inlet 56 in the bottom of the outer tank 10 and an outlet connected to the three-way fitting 52. A conventional manual valve 58 is provided in the elbow connection 54 to control the flow through the connection and thereby control draining of the outer tank 10. The inner tank 12 is connected to the common drain 50 through a connecting pipe or conduit 60 depending from the large aperture 26 in the bottom wall of the inner tank 12 through the outer tank 10 in fluid-tight relation thereto and to the three-way fitting 52.

To control draining of the inner tank 12 through the depending connection 60, a valve 62 (FIG. 3) is provided which seats upon a valve seat 64 formed in the bottom wall of the inner tank 12. Valve 62 may be of the lavatory flush-tank, float type, and it is slidably mounted upon an operating rod 66 which extends axially of the depending drain connection 60 and through a suitable packing gland in a depending neck 68 on the three-way fitting 52 where it may be connected to the projecting end of the plunger on a conventional solenoid 70 operable when energized to raise the operating rod 66 as indicated in full lines in FIG. 3. The latter has an abutment 72 intermediate its ends which engages the underside of the float valve 62 to raise the latter from the seat 64 when the solenoid 70 is energized. The range of movement of the operating rod 66 is sufficient to raise the float valve 62 far enough above the seat 64 so that the float valve, due to its buoyancy, will remain open while there is liquid above the valve seat 64, in spite of the return of the solenoid plunger and the operating rod 66 to inoperative position. The float valve 62 is slidable on the upper end of the operating rod 66, and the latter is long enough to allow for lost motion with the float valve sufficient to allow the valve to be returned to inoperative position immediately after the float valve 62 opens, the operating rod being returned by the return spring (not shown) in the solenoid 70. The operating rod 66 has an abutment 73 on its upper end to prevent disengagement of the float valve 62 from the same.

Figure 6:
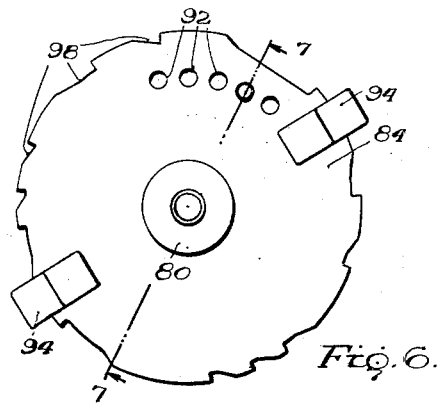
FIG. 6 is a front elevational view of a masking disc which is associated with the frequency cam in the timing mechanism.
Figure 7:
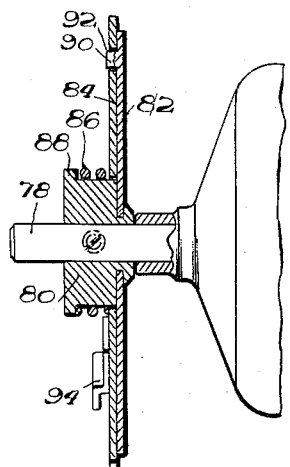
FIG. 7 is a diametrical sectional view on the line 7—7 (FIG. 6) of the frequency cam and masking disc showing these parts drivingly interconnected.
Figure 5:
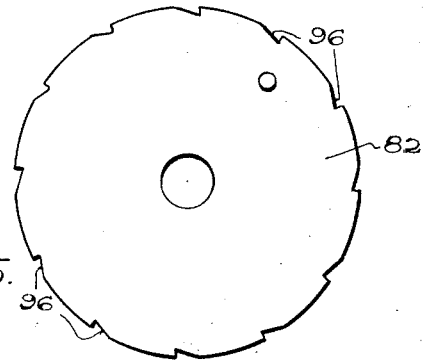
FIG. 5 is a front elevational view of a frequency cam used in the timing mechanism shown in FIG. 4.
Figure 8:
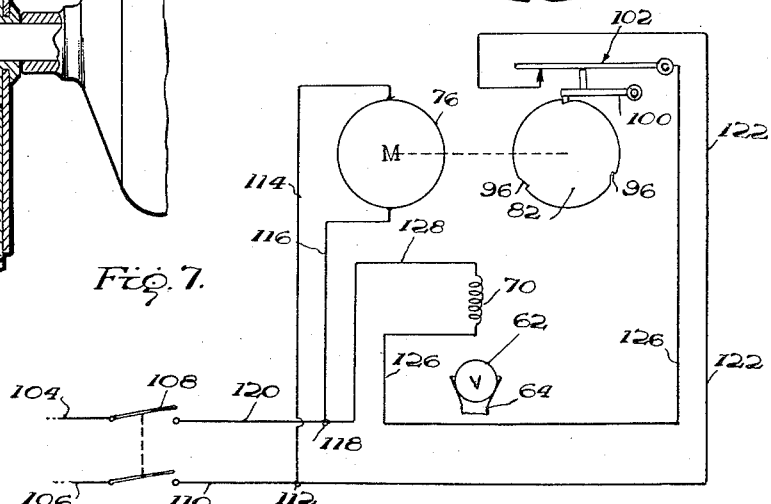
FIG. 8 is a schematic wiring diagram of the timing mechanism and the solenoid operated valve controlled by this timing mechanism.

The solenoid 70 is periodically energized through a circuit disclosed in FIG. 8 which is closed and opened automatically by a timing mechanism disclosed in FIGS. 4 to 6. This timing mechanism which may be housed in a control box 74 mounted on top of the outer tank 10 comprises an electric motor indicated diagrammatically at 76 in FIG. 7. Any suitable motor may be used for this purpose such as a synchronous motor of the type used in electric clocks. This motor drives a shaft 78 through suitable gearing (not shown) at a uniform speed, and this shaft has a hub 80 fixedly mounted thereon upon which a frequency cam 82 is fixedly secured. A second disc-shaped member 84, which will hereinafter be called a masking disc, is also carried upon hub 80, but is free to rotate with respect thereto, the masking disc being biased into face-to-face contact with the frequency cam 82 by an expansion spring 86 (FIG. 6) reacting between the masking disc and a flange 88 on the hub 80. The frequency cam and masking disc are drivingly interconnected by a pin 90 fixed in the cam and adapted to engage in any one of a series of apertures 92 in the masking disc. By means of a pair of radial lugs or tabs 94 fixed to the masking disc 84 at diametrically oppositely disposed positions, the masking disc may be drawn axially against the resistance of the spring 86 far enough away from the frequency cam 82 to disengage the disc from the pin 90, thus freeing the disc and cam for angular adjustment relative to each other so that any one of the apertures 92 may be brought into engagement with the pin 90.

The frequency cam 82 has a series of duplicate notches or recesses 96 equally spaced around the periphery thereof as seen in FIG. 5, while the masking disc 84 has a series of irregularly spaced peripheral notches 98 of varying length as seen in FIG. 6, these notches being of such length and so arranged that the notches 96 in the frequency cam 82 may be symmetrically masked. In other words, the masking disc 84 may be so adjusted that one only or any number of the notches 96 in the frequency cam 82 up to the entire twelve notches may be unmasked by suitable adjustment of the masking disc 84. The notches unmasked by this adjustment of the masking disc actuate a follower 100 (FIG. 4) riding on the periphery of the frequency cam 82 at uniform intervals of time. This follower comprises the operating arm of a microswitch 102. It is to be understood that the arrangement of recesses or notches shown in FIGS. 5 and 6 is merely exemplary and may be varied as desired, or the speed at which this assembly is driven may be varied to vary the time interval that may be obtained between successive actuations of the microswitch 102. In FIG. 4 the masking disc 84 is shown adjusted relative to the frequency cam 82 to unmask three notches 96 located at equally spaced intervals on the periphery of the frequency cam 82 so that microswitch 102 will be closed three times during each complete turn of the time shaft 78 when the parts are so adjusted. For the purposes of the apparatus of the present invention, the notches 96 in the frequency cam 82 should be formed as shown in FIG. 5 with an abrupt or instantaneous drop and a rapid rise so as to cause the microswitch 102 to close instantaneously and to open almost immediately after it closes.

The microswitch 102 controls energization of the solenoid 70 through a circuit schematically shown in FIG. 8. In this view, conductors 104 and 106 designate the source of current which is controlled by a manually operable master switch 108, while the electric timing motor 76, frequency cam 82, microswitch 102, solenoid 70, and discharge valve 62 for the inner tank are designated by the same numbers heretofore used to designate these parts. When the master switch 108 is closed, the timing motor 76 is energized through a conductor 110, a junction 112 and conductors 114 and 115, a junction 118 and a conductor 120. Assuming microswitch 102 is open when the master switch 108 is shifted to closed position, motor 76 will drive the drivingly interconnected frequency cam 82 and the masking disc 84 continuously throughout the time the master switch is closed. When one of the duplicate notches 96 in the frequency cam not masked by the masking disc 84 is brought opposite the follower or operating arm 100 on microswitch 102, the operating arm drops into the notch closing a solenoid energizing circuit from the manual switch 108 through conductor 110, junction 112, a conductor 122, microswitch 102, a conductor 126, the solenoid 70, a conductor 128, junction 118, and the conductor 120 back to the manual switch, thereby causing the exhaust or discharge valve 62 to be raised from the seat 64 as previously explained. As also previously explained, the duplicate notches 96 in the frequency cam are shaped so that the switch arm 100 rises out of the notch in which it has dropped almost immediately after dropping into the same, thereby opening the solenoid energizing circuit above described shortly after it closes. However, the buoyancy of the valve 62 prevents closure thereof until the inner tank or vessel 12 has drained, the valve being guided to the seat 64 by the upwardly projecting end of the operating rod 66. Since the perforations 24 in the bottom wall of inner tank 12 remain open at all times, the liquid in the outer tank 10 will flow into the inner tank 12 while the latter is draining. However, in an apparatus wherein the perforations 24 and the discharge outlet aperture 26 are of the dimensions heretofore mentioned, i.e., 26 perforations, each 3/16-inch in diameter and a single outlet aperture 1½ inch in diameter, the effective area of the latter is more than four times that of all the perforations combined so that the inner tank 12 will drain in spite of the fact that the liquid is flowing into the same through perforations 24 during draining.

Any drop in the level of the liquid in the outer tank 10 resulting from passage of liquid to the inner tank 12 causes the float 40 to drop and to open valve 38 and energize the pump 34, thereby replenishing the liquid in the outer tank 10. To avoid overflow in the event of malfunctioning of the float valve 38 or pump 34, an overflow pipe 130 is provided having an inlet adjacent the level of the top edge of inner tank 12. This overflow pipe drains into the common drain connection 50 as seen in FIG. 1, being connected to the elbow 54 for draining the outer tank 10.

To prevent interference with the operation of the operating rod 66 or the float valve 62 by the presence of samples or materials under test in the inner tank 12, the latter is provided with a screen or grid 132 forming a false bottom for the same. This screen is elevated from the bottom of the inner tank 12 a distance greater than the highest elevation to which the operating rod 66 is raised in the inner tank.

When the materials or samples to be treated are small, the number of samples which may be treated at any one time can be increased by subdividing the inner tank 12 into separate compartments. This is done by inserting partitions or dividers 134 in the inner tank. By way of illustration, six partitions are shown in FIG. 2 dividing the inner tank 12 into sixteen compartments of substantially duplicate size. Other arrangements of partitions can, of course, be made to divide the inner tank into a larger or smaller number of individual compartments, and this tank may also be divided into superimposed layers of compartments by means of horizontal partitions (not shown) which may comprise screens similar to the screens 132.

In addition to housing the timing mechanism as previously explained, the control box 74 may house suitable conventional controls for controlling the temperature in preheater tank 28 and outer tank 10 such as the previously mentioned thermostatic element 46 which depends into the inner tank, along with instruments for indicating the temperature in the inner, outer, and preheater tanks and for controlling admission of liquid to the preheater tank 28. A suitable conventional on-off control may also be provided for the feed pump 34 and the agitating pump 48. Preferably, a conventional counter mechanism is also provided to indicate the number of cycles of the solenoid operated float valve 62. Any other controls found desirable may also be included in the control box.

Although a specific form of the timing mechanism has been shown, it is to be understood that any other suitable conventional mechanism may be used for this purpose. In practice, it has been found desirable to provide a timing mechanism which may be adjusted to open the discharge valve at intervals varying from once every ten minutes to once every four hours, the interval between cycles depending on the material being tested. The number of cycles to which a material is subjected will also depend on the materials under test.

While a preferred embodiment of the invention has been shown and described, it will be apparent that variations and modifications thereof may be made without departing from the underlying principles of the invention. It is desired, therefore, by the following claims, to include within the scope of the invention, all such variations and modifications by which substantially the results of the invention may be obtained through the use of substantially the same or equivalent means.

We claim:

1. A device of the class described comprising fixedly associated inner and outer vessels, fluid-supply means automatically to maintain a predetermined fluid level in said outer vessel, means to admit fluid from said outer vessel to said inner vessel in relatively small uniformly distributed jets of predetermined substantially uniform low velocity whenever the level of the fluid in the inner vessel drops below the level in the outer vessel and cyclically operable means for draining fluid from said inner vessel at a rate greatly in excess of the rate at which fluid is admitted thereto so that the inner vessel can be substantially completely emptied at the same time that fluid is being admitted thereto.

2. A device of the class described comprising an imperforate outer vessel, an inner vessel fixed in said outer vessel and having lower and side wall structure spaced inwardly from the corresponding wall structure of said outer vessel, said lower wall structure being perforated to establish direct communication between the inner and outer vessels, fluid-supply means for automatically maintaining a predetermined fluid level in said outer vessel, said inner vessel receiving fluid from the outer vessel through said perforated lower wall structure tending to equalize the level of the fluid in the two vessels, a valve controlled outlet having a capacity for draining fluid from the said inner vessel greatly in excess of the capacity of the perforations in said lower wall structure to admit fluid thereto from the outer vessel and means for controlling said valve controlled outlet.

3. A device as defined in claim 2 wherein the lower wall structure only of said inner vessel is perforated and the perforations are relatively small and uniformly distributed over the entire area of the said bottom wall so that differences in the head of fluid in said two vessels will produce a flow of fluid through said apertures in the form of relatively small jets until the level of the fluid in the two vessels equalizes.

4. A device as defined in claim 2 wherein the means for controlling said valve controlled outlet automatically opens said outlet at regular intervals for periods of time sufficient to drain said inner vessel substantially completely.

5. A device of the class described comprising an outer vessel and a smaller inner vessel rigidly fixed in said outer vessel to define a space between the side and bottom walls thereof and to locate the upper edge of the inner vessel below the upper edge of said outer vessel, the bottom wall of said inner vessel having a plurality of relatively small apertures therein, fluid-supply means for said outer vessel, said inner vessel being supplied with fluid from said outer vessel through the perforations in said bottom wall, float-controlled means to control said fluid-supply means in response to the rise and fall of the liquid relative to a predetermined level located below the upper edge of said inner vessel, an overflow to prevent the fluid from rising above the level of the top edge of said inner vessel in the event said float-controlled means fails to function and means for draining fluid from said inner vessel at a rate in excess of the rate at which fluid is admitted thereto so that the said inner vessel may be substantially completely emptied at the same time that fluid is being admitted thereto.

6. A device of the class described comprising an outer vessel and a smaller inner vessel rigidly fixed in said outer vessel to define a space between the side and bottom walls of the two vessels, the bottom wall of said inner vessel having a plurality of relatively small apertures therein, a source of fluid, means for supplying fluid from said source to the space between said vessels, said inner vessel being supplied with fluid from the said space between said vessels at a limited rate through the perforations in the bottom wall thereof when the level of the fluid therein drops below that in the said space, means responsive to variations in the level of the fluid in the space between said vessels for controlling operation of said fluid-supply means, an outlet for draining fluid from said inner vessel at a rate greatly in excess of the fluid-admitting capacity of the perforations in the bottom wall of said inner vessel, a valve in said outlet and means for controlling operation of said valve.

7. A device of the class described comprising an outer vessel and a smaller inner vessel rigidly fixed in said outer vessel to define a space between the side and bottom walls of the two vessels, the bottom wall of said inner vessel having a plurality of relatively small apertures therein, a source of fluid, means for supplying fluid from said source to the space between said vessels, said inner vessel being supplied with fluid from the said space between said vessels at a limited rate through the perforations in the bottom wall thereof when the level of the fluid therein drops below that in the said space, means responsive to variations in the level of the fluid in the space between said vessels for controlling operation of said fluid-supply means, an outlet for draining fluid from said inner vessel at a rate greatly in excess of the fluid-admitting capacity of the perforations in the bottom wall of said inner vessel, a valve in said outlet, means for controlling operation of said valve, and means for heating said fluid and for controlling the temperature thereof.

8. A device of the class described comprising an outer vessel and a smaller inner vessel rigidly fixed in said outer vessel to define a space between the side and bottom walls thereof, the bottom wall of said inner vessel having a plurality of relatively small apertures therein, a source of fluid, means for supplying fluid from said source to the space between said vessels, said inner vessel being supplied with fluid from the said space between said vessels at a limited rate through the perforations in the bottom wall thereof when the level of the fluid therein drops below that in the said space, means responsive to variations in the level of the fluid in the space between said vessels for controlling operation of said fluid-supply means, an outlet for draining fluid from said inner vessel at a rate greatly in excess of the fluid-admitting capacity of the perforations in the bottom wall of said inner vessel, a valve in said outlet, valve operating means and a timer for cyclically activating said valve operating means.

9. A device of the class described comprising an imperforate outer vessel, an inner vessel fixed in said outer vessel and having lower and side wall structure spaced inwardly from the corresponding wall structure of said outer vessel, said lower wall structure being perforated to establish direct communication between the outer and inner vessels, fluid-supply means for automatically maintaining a predetermined fluid level in said outer vessel, said inner vessel receiving fluid from the outer vessel through said perforated wall structure tending to equalize the level of the fluid in the two vessels, the perforations in said lower wall being small enough to cause the flow of fluid therethrough to take the form of relatively small jets, a valve controlled outlet adjacent the bottom of said inner vessel having a capacity to discharge fluid from said inner vessel greatly in excess of the capacity of the perforations in said lower wall structure to admit fluid thereto from the outer vessel, means for controlling opening and closing of said valve controlled outlet and a grid disposed in said inner vessel in a plane generally parallel to the lower wall thereof and located above said valve controlled outlet.

10. A device of the class described comprising an imperforate outer vessel, an inner vessel fixed in said outer vessel and having lower and side wall structure spaced inwardly from the corresponding wall structure of said outer vessel, said lower wall structure being perforated to establish direct communication between the outer and inner vessels, fluid-supply means for automatically maintaining a predetermined fluid level in said outer vessel, said inner vessel receiving fluid from the outer vessel through said perforated wall structure tending to equalize the level of the fluid in the two vessels, the perforations in said lower wall being small enough to cause the flow of fluid therethrough to take the form of relatively small jets, a valve controlled outlet adjacent the bottom of said inner vessel having a capacity to discharge fluid from said inner vessel greatly in excess of the capacity of the perforations in said lower wall structure to admit fluid thereto from the outer vessel, means for controlling opening and closing of said valve controlled outlet, a grid disposed in said inner vessel in a plane generally parallel to the lower wall thereof and located above said valve controlled outlet and a series of partitions subividing the area in said inner vessel above said grid into a series of compartments.

11. A device of the class described comprising an outer vessel and a smaller inner vessel rigidly fixed in said outer vessel to define a space between the side and bottom walls of the two vessels, the bottom wall of said inner vessel having a plurality of relatively small apertures therein, a source of fluid, means for supplying fluid from said source to the space between said vessels, said inner vessel being supplied with fluid from the said space between said vessels through the perforations in the bottom wall thereof when the level of the fluid therein drops below that in said space, the small size of said perforations confining flow of fluid therethrough to relatively small jets, means responsive to variations in the level of the fluid in the space between said vessels for controlling operation of said fluid-supply means, inner vessel outlet forming means depending from the bottom of said inner vessel through said outer vessel in fluid-tight relation to the latter including a valve seat, said outlet forming means having a discharge capacity greatly in excess of the fluid admitting capacity of the perforations in the bottom wall of said inner vessel, a valve cooperable with said valve seat to control discharge through said outlet forming means and means for opening said valve cyclically including mechanism in said outlet forming means for raising said valve from its seat.

12. A device of the class described comprising an outer vessel and a smaller inner vessel rigidly fixed in said outer vessel to define a space between the side and bottom walls of the two vessels, the bottom wall of said inner vessel having a plurality of relatively small apertures therein, a source of fluid, means for supplying fluid from said source to the space between said vessels, said inner vessel being supplied with fluid from the said space between said vessels through the perforations in the bottom wall thereof when the level of the fluid therein drops below that in the said space, the small size of said perforations confining flow of fluid therethrough to relatively small jets, means responsive to variations in the level of the fluid in the space between said vessels for controlling operation of said fluid-supply means, an outlet for discharging fluid from said inner vessel at a rate greatly in excess of the fluid-admitting capacity of the perforations in the bottom wall of said inner vessel, a valve in said outlet, means for controlling said valve and a valve controlled outlet for draining said outer vessel.

References Cited in the file of this patent

UNITED STATES PATENTS

| | | |
|---|---|---|
| 483,335 | Whiteley | Sept. 27, 1892 |
| 695,766 | Sonneborn | Mar. 18, 1902 |
| 878,010 | Merrell | Feb. 4, 1908 |
| 1,518,484 | Cooley | Dec. 9, 1924 |
| 2,235,336 | Schuster | Mar. 18, 1941 |
| 2,329,623 | Judy | Sept. 14, 1943 |
| 2,499,454 | Bowman | Mar. 7, 1950 |
| 2,527,178 | Elasesser | Oct. 24, 1950 |
| 2,743,733 | Sacks | May 1, 1956 |
| 2,847,844 | Morrison | Aug. 19, 1958 |

UNITED STATES PATENT OFFICE
CERTIFICATE OF CORRECTION

Patent No. 3,015,226　　　　　　　　　　　　January 2, 1962

Richard T. Darby et al.

It is hereby certified that error appears in the above numbered patent requiring correction and that the said Letters Patent should read as corrected below.

Column 3, line 47, after "liquid" insert -- agitating pump 48 may also be provided for stirring up the liquid --; line 50, for "direction" read -- direct --; column 8, line 61, for "subidividing" read -- subdividing --.

Signed and sealed this 8th day of May 1962.

(SEAL)
Attest:

ERNEST W. SWIDER　　　　　　　　　　　　DAVID L. LADD
Attesting Officer　　　　　　　　　　　　Commissioner of Patents